June 26, 1956  J. GASSMANN  2,751,895
VALVE CONTROL FOR INTERNAL COMBUSTION ENGINES
Filed May 14, 1953

Inventor
Johannes Gassmann
By Wicke, Pedlow & Craig
Attorneys

United States Patent Office 2,751,895
Patented June 26, 1956

2,751,895

VALVE CONTROL FOR INTERNAL COMBUSTION ENGINES

Johannes Gassmann, Altbach, near Esslingen (Neckar), Germany, assignor to Daimler-Benz Aktiengesellschaft, Stuttgart-Unterturkheim, Germany Application May 14, 1953, Serial No. 355,063

Claims priority, application Germany May 20, 1952

3 Claims. (Cl. 123—90)

This invention relates to a valve control for internal combustion engines with positive valve movement in each cycle.

An important object of the invention relates to an improved arrangement and construction of the control mechanism permitting most free selection of control timing to thereby eliminate, for example, the disadvantages resulting from the employment of a control link whereby the fixed distance between the two link planes makes a cam form compulsory in which the cam fits accurately between these two link planes in each angular position.

It is therefore an essential feature of the invention that two cams are associated with the valve, one of these effecting positive valve opening and the other one positive valve closing.

According to another feature of the invention at least one of the two cams is indirectly effective upon the valve, i. e., through the medium of an intermediate lever system.

According to a further feature of the invention with a view to ensure playless engagement of the two legs and to ensure that the valve is always seated upon its seat, the two legs of an interposed angle-lever are arranged rotatably or spreadably as to each other, and a spring force, for example, a coil spring subjected to bending, a torsion bar, etc., is provided to act against this spreading.

Figure 1:
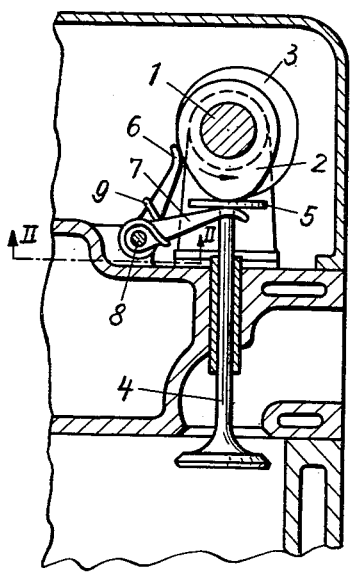
Figure 2:
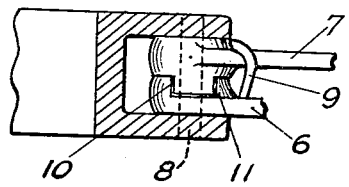

Further objects, features and advantages of the present invention will become more obvious from the following description when taken in connection with the accompanying drawing which shows for purposes of illustration only one preferred embodiment of the present invention, and wherein:

Figure 1 is a cross sectional view showing the valve control mechanism in accordance with the present invention, and Figure 2 is a partial cross sectional view taken along the lines II—II of Figure 1.

Rigidly secured side by side upon the cam shaft 1 are the valve-opening cam 2 and the valve-closing cam 3. The valve-opening cam 2 bears directly upon the pressure plate 5 rigidly secured upon the valve stem 4. The intermediate lever system consists of the two legs 6 and 7 which are—independently of each other—rotatably supported upon the shaft 8. The leg 6 is in abutting engagement with the valve-closing cam 3, and the leg 7 is forked at its end to thereby embrace the valve stem 4 and bears against the pressure plate 5 from below. The spread angle between the two legs 6 and 7 is upwardly limited by two stops 10 at the two legs. The coil spring 9 subject to bending functions to keep the spread angle as small as possible so as to effect that the free ends of the legs 6 and 7 are always in abutting engagement. The stops 11 also provided at the hubs of the two legs or lever arms 6 and 7 determine the smallest angle which is possible between the two legs 6 and 7 by reason of the abutment between the abutting surfaces of these stops when such predetermined smallest angle is achieved.

The fully open position into which the valve was urged by the cam projection of the cam 2 is shown in the drawing. When the cam shaft 1 revolves further in the counterclockwise direction, the leg 6 will then be turned by the valve-closing cam 3 toward the left and by way of the spring 9 and abutment of the stops 10 it takes the leg 7 along in its upward movement, and the latter on its part lifts the pressure plate 5 and therewith the entire valve and closes it. The cam projection of the valve-opening cam 2 must, of course, decrease by the same amount.

The operation of the valve control mechanism of the present invention may be divided into four distinct phases which are as follows:

*1. Acceleration of the valve during opening movement thereof*

During opening movement the valve 4 moves downwardly and is accelerated in that direction. This acceleration is produced by the direct interaction of the cam 2 with the plate 5 of the valve 4.

*2. Deceleration of the valve during opening movement thereof*

As the valve 4 moves downwardly during the opening movement thereof, it is decelerated by the interaction of the cam 3 with the lever arm 6. By the abutting engagement of the stops 10 the lever arm 6 positively entrains the arm 7, so that the movement of the lever arm 7 becomes effective as a braking force producing deceleration of the valve 4.

It should be noted that such deceleration is positive after the limited free relative movement of the two lever arms by reason of the abutting engagement of the stops 10 so that the deceleration is positively effected by cam 3.

*3. Acceleration of the valve during closing movement thereof*

When the valve reaches its completely opened position, movement thereof is reversed and it is accelerated in an upward direction. Such acceleration is positively effected by the interaction of the cam 3 with the lever arm 6 which positively entrains the lever arm 7 through the abutting engagement of the stops 10.

*4. Deceleration of the valve during closing movement thereof*

As the valve moves upwardly it is decelerated by the interaction of the cam 2 with the plate 5 of the valve 4.

Under certain circumstances it can be suitable for the object in view to provide an additional spring arranged in conventional manner; hence a spring which urges the valve upon its seat or the valve stem or the respective member of the intermediate lever system upon the cam.

What is claimed is:

1. A valve control for internal combustion engines having a valve adapted to alternately open and close a valve duct leading to the cylinder space by the reciprocating movement thereof, and a valve control mechanism, said control mechanism comprising a first cam operatively and directly engaging said valve to positively control the opening movement thereof, a second cam, a lever system between said second cam and said valve to transmit the control effect of said second cam to said valve including a first lever arm operatively engaging said second cam, a second lever arm operatively engaging said valve to effect closing movement thereof, a resilient member between said two lever arms to resiliently connect said lever arms with each other and constantly urge simultaneous engagement of said first lever arm with said second cam and of said second lever arm with said valve, and mutually abutting stop means on said lever arms operative upon predetermined limited relative movement of said lever arms to limit the maximum spreading angle thereof and to provide positive predetermined deceleration of said valve in the opening movement thereof and positive predetermined acceleration in the closing movement thereof by the action of said second cam upon abutting engagement of said stop means.

2. A valve control according to claim 1, further comprising stop means to provide positive engagement between said lever arms in the opposite direction produced by said first-mentioned stop means.

3. The valve control according to claim 1, wherein said resilent member is formed as a torsion spring.

References Cited in the file of this patent

UNITED STATES PATENTS

| | | |
|---|---|---|
| 1,227,812 | MacPherson | May 29, 1917 |
| 1,633,882 | Ballot | June 28, 1927 |
| 1,644,059 | Holle | Oct. 4, 1927 |

FOREIGN PATENTS

| | | |
|---|---|---|
| 701,697 | France | Sept. 4, 1930 |